(12) United States Patent
Mirza et al.

(10) Patent No.: US 10,580,110 B2
(45) Date of Patent: Mar. 3, 2020

(54) HARDWARE STRUCTURE TO TRACK PAGE REUSE

(71) Applicant: ATI Technologies ULC, Markham (CA)

(72) Inventors: Jimshed Mirza, Toronto (CA); Al Hasanur Rahman, Newmarket (CA); Sergey Korobkov, Richmond Hill (CA); Houman Namiranian, Toronto (CA)

(73) Assignee: ATI Technologies ULC, Markham (CA)

( * ) Notice: Subject to any disclaimer, the term of this patent is extended or adjusted under 35 U.S.C. 154(b) by 52 days.

(21) Appl. No.: 15/496,637

(22) Filed: Apr. 25, 2017

(65) Prior Publication Data

US 2018/0308216 A1     Oct. 25, 2018

(51) Int. Cl.
*G06T 1/60* (2006.01)
*G06F 13/24* (2006.01)
*G06F 12/1009* (2016.01)
*G06F 12/121* (2016.01)

(52) U.S. Cl.
CPC ............... *G06T 1/60* (2013.01); *G06F 13/24* (2013.01); *G06F 12/1009* (2013.01); *G06F 12/121* (2013.01)

(58) Field of Classification Search
CPC ..... G06T 1/60; G06F 12/1009; G06F 12/121; G06F 13/24
See application file for complete search history.

(56) References Cited

U.S. PATENT DOCUMENTS

| | | | |
|---|---|---|---|
| 7,669,011 B2 | 2/2010 | Conway | |
| 8,499,066 B1 | 7/2013 | Zhang et al. | |
| 10,067,709 B2 | 9/2018 | Piga et al. | |
| 10,089,014 B2 | 10/2018 | Uppal et al. | |
| 2004/0179016 A1* | 9/2004 | Kiser | G09G 5/395 345/531 |
| 2008/0168203 A1* | 7/2008 | Moorkanikara Nageswaran | G06F 13/26 710/264 |
| 2013/0036266 A1 | 2/2013 | Naganuma et al. | |
| 2014/0013020 A1* | 1/2014 | Horsnell | G06F 13/24 710/260 |
| 2014/0365738 A1 | 12/2014 | Hod et al. | |
| 2015/0088805 A1 | 3/2015 | Kakarla et al. | |

(Continued)

*Primary Examiner* — Masud K Khan
(74) *Attorney, Agent, or Firm* — Meyertons Hood Kivlin Kowert and Goetzel PC; Rory D. Rankin

(57) ABSTRACT

Systems, apparatuses, and methods for tracking page reuse and migrating pages are disclosed. In one embodiment, a system includes one or more processors, a memory access monitor, and multiple memory regions. The memory access monitor tracks accesses to memory pages in a system memory during a programmable interval. If the number of accesses to a given page is greater than a programmable threshold during the programmable interval, then the memory access monitor generates an interrupt for software to migrate the given page from the system memory to a local memory. If the number of accesses to the given page is less than or equal to the programmable threshold during the programmable interval, then the given page remains in the system memory. After the programmable interval, the memory access monitor starts tracking the number of accesses to a new page in a subsequent interval.

17 Claims, 8 Drawing Sheets

(56) References Cited

U.S. PATENT DOCUMENTS

2016/0147619 A1* 5/2016 Borthakur ............ G06F 12/1009
                                                      714/768
2016/0378655 A1  12/2016 Blagodurov et al.
2017/0132083 A1*  5/2017 Aslot .................. G06F 11/1402
2017/0262216 A1   9/2017 Polkovnikov et al.
2018/0074715 A1   3/2018 Farmahini-Farahani et al.
2018/0189188 A1*  7/2018 Kumar ................ G06F 12/1009

* cited by examiner

HARDWARE STRUCTURE TO TRACK PAGE REUSE

BACKGROUND

Description of the Related Art

To meet memory bandwidth, latency and capacity demands, computing systems often include multiple levels of memory. Additionally, high bandwidth memory systems are often composed of multiple classes of memory. For example, a system can include high-bandwidth, low-latency memory devices that are relatively near to processing units, and larger, lower-bandwidth, higher-latency general memory devices that are further from the processing units. In another example, two virtual memory systems can be utilized in a system with a graphics processing unit (GPU) and a central processing unit (CPU). A first virtual memory system can be utilized by the GPU which is backed up by a second virtual memory system on the CPU. In these systems, determining how to allocate data to the different memory regions can be challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing hardware mechanisms to track page reuse are disclosed. In one embodiment, a system includes at least a first memory, a second memory, and a control unit. In one embodiment, the control unit is configured to monitor a number of accesses to each page of a plurality of pages in the first memory during a programmable interval. The control unit is configured to cause a given page to be migrated from the first memory to the second memory responsive to determining a number of accesses to the given page has exceeded a programmable threshold during the programmable interval. In one embodiment, the first memory is a system memory and the second memory is a high-bandwidth memory (HBM).

In one embodiment, the control unit generates an interrupt for software to migrate the given page from the first memory to the second memory responsive to determining the number of accesses to the given page has exceeded the programmable threshold during the programmable interval. In one embodiment, the system also includes one or more processors, and software executing on the one or more processors is configured to migrate the given page from the first memory to a second memory responsive to detecting the interrupt. As used herein, the term "interrupt" refers to any indication or signal conveyed to or otherwise accessible by software or a hardware entity.

In one embodiment, the system includes a table, and the table includes an entry for each page of the plurality of pages being monitored. When the control unit detects an access to a given page, the control unit allocates an entry for the given page in the table and starts a timer for the given page. Each time the given page is accessed, the control unit increments a counter for the entry. If the counter saturates, then the control unit generates an interrupt for the given page to be migrated from the first memory to the second memory. If the given page's timer expires, then control unit evicts the entry for the given page from the table and allocates a new entry for a different page in its place.

Figure 1:
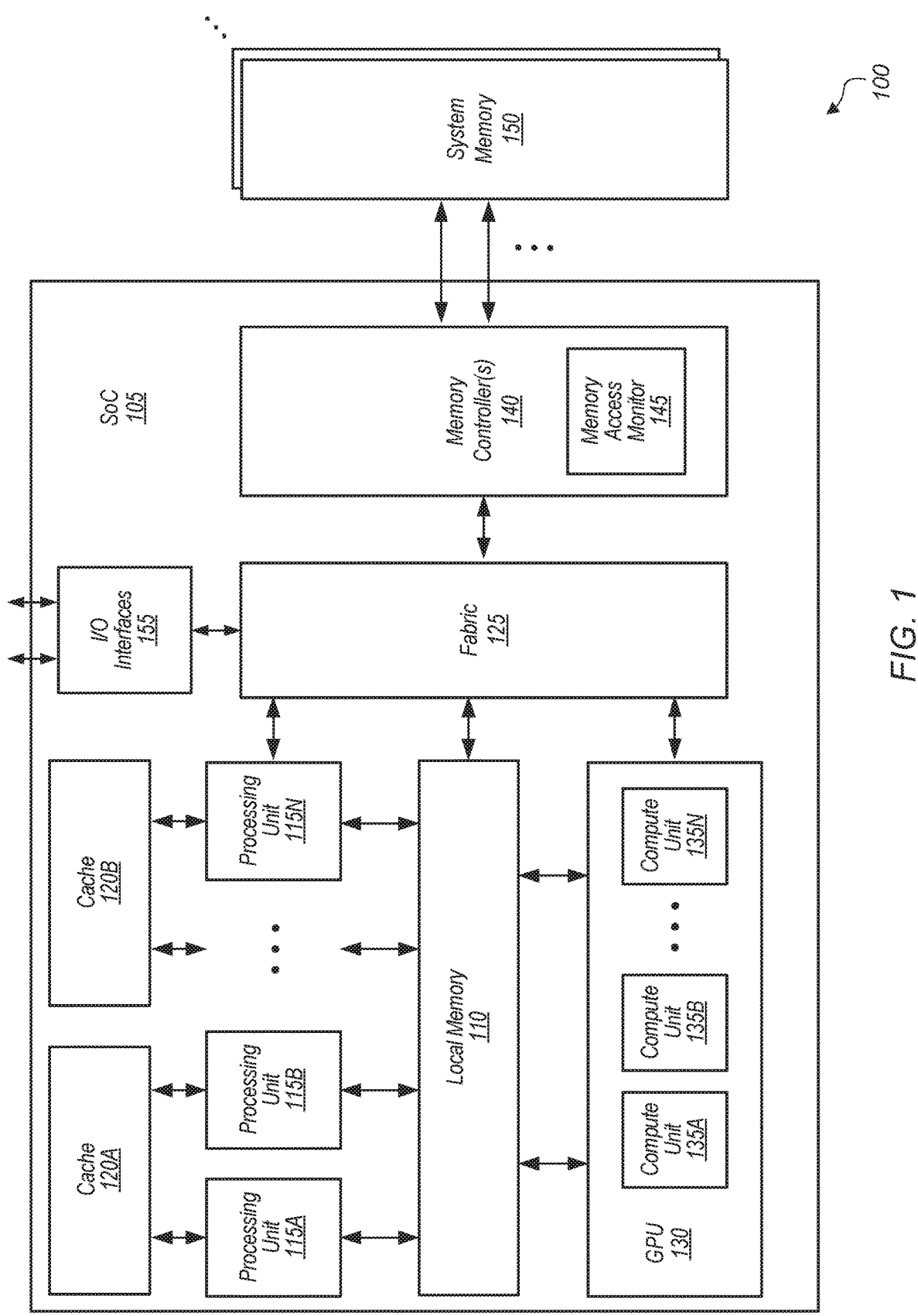
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes local memory 110, processing units 115A-N, input/output (I/O) interfaces 155, caches 120A-B, fabric 125, graphics processing unit (GPU) 130, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to local memory 110, caches 120A-B, and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes at least compute units 135A-N which are representative of any number and type of compute units that are used for graphics or general-purpose processing. GPU 130 is coupled to local memory 110 and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

Processing units 115A-N and GPU 130 are coupled to local memory 110. It is noted that local memory 110 can also be referred to as a "frame buffer". In one embodiment, the local memory includes high-bandwidth memory (HBM). Processing units 115A-N and GPU 130 are also coupled to system memory 150 via fabric 125 and memory controller(s) 140. In one embodiment, system memory 150 includes multiple memory modules on multiple separate memory channels. Each memory channel includes a separate memory controller 140, with the number of memory channels and memory controllers 140 varying from embodiment to embodiment.

Each memory controller 140 includes a memory access monitor 145, with each memory access monitor 145 configured to monitor memory accesses targeting system memory 150. In one embodiment, each memory access monitor 145 is located in a corresponding memory controller 140. In other embodiments, memory access monitor 145 can be located in other locations of SoC 105 external to memory controller 140. For example, in another embodiment, memory access monitor 145 is located in fabric 125. In one embodiment, each memory access monitor 145 includes a table for storing entries corresponding to memory pages which have been accessed by software executing on processing units 115A-N and/or GPU 130. As used herein, the term "page" is defined as a fixed-length contiguous block of virtual memory. A "page" is also defined as the smallest unit of data utilized for memory management by system 100. The size of a page can vary from embodiment to embodiment. It should be understood that the terms "memory page" and "page" are intended to represent any size of memory region.

Each entry in the table stores the address and other information associated with a page of system memory 150. Each entry is active for a programmable interval, and while the entry is active, memory access monitor 145 monitors a number of accesses to the page. At the end of the programmable interval, if the number of accesses for a given page is greater than a programmable threshold, then memory access monitor 145 generates an interrupt for software to migrate the given page from system memory 150 to local memory 110 and evicts the entry from the table. If the number of accesses for the given page is less than the programmable threshold, then memory access monitor 145 evicts the entry from the table and does not generate an interrupt for the given page, with the given page remaining in system memory 150. Then, memory access monitor 145 samples the address of an access being made to system memory 150 and stores the address in the vacated entry. Also, memory access monitor 145 restarts the programmable interval for the new address's entry and repeats the same process of tracking a number of accesses to the new address during the programmable interval.

I/O interfaces 155 are coupled to fabric 125, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 135A-N. In some embodiments, SoC 105 includes caches 120A-B that are utilized by processing units 115A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
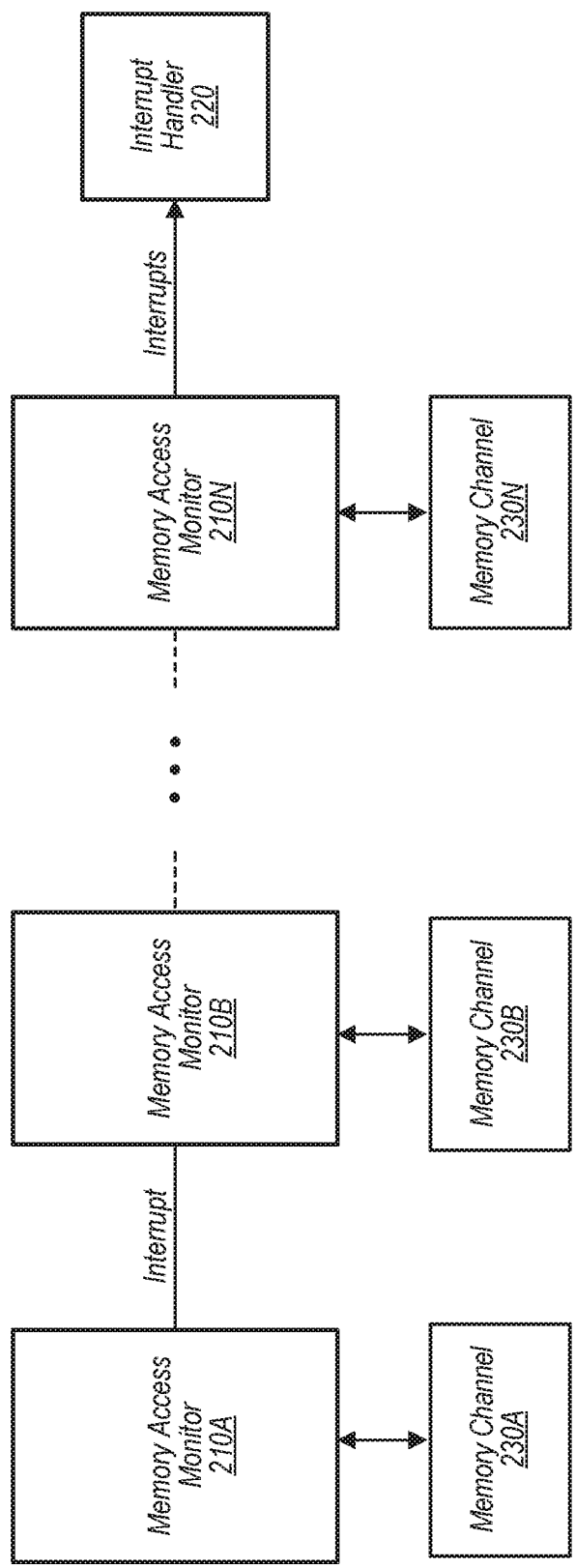
FIG. 2 is a block diagram of one embodiment of a chain of multiple memory access monitors.

Turning now to FIG. 2, a block diagram of one embodiment of multiple memory access monitors chained together is shown. Memory access monitors 210A-N are representative of any number of memory access monitors which are implemented as part of a computing system. Each memory access monitor 210A-N is configured to monitor memory requests on a corresponding memory channel 230A-N. When memory access monitor 210A detects that a page in a first memory has been accessed more than a threshold number of times in a given interval, memory access monitor 210A generates an interrupt for software to migrate the given page to a second memory from the first memory. In one embodiment, the first memory is a system memory and the second memory is a local memory. In other embodiments, the first and second memories can be other types of memories. An interrupt generated by memory access monitor 210A is conveyed to the next memory access monitor in the chain of memory access monitors. Accordingly, the interrupt is conveyed to memory access monitor 210B and then through the other memory access monitors until the interrupt is eventually conveyed to interrupt handler 220 by memory access monitor 210N.

In one embodiment, each interrupt includes an address of the page, a memory channel utilized to access the page, a number of accesses over a programmable interval, and a request type. In other embodiments, the interrupt data sent to interrupt handler 220 via the chain of memory access monitors 210A-N can include other information and/or omit one or more of the above fields of information. In one embodiment, the request type indicates if the page was read or written, and the request type also indicates if the page was modified. When software executing on one or more processors detects the interrupt received by interrupt handler 220, software migrates the page into the second memory. Software can also determine which page to evict from the second memory to make room for the migrated page, using any suitable scheme for determining which page to evict.

Figure 3:
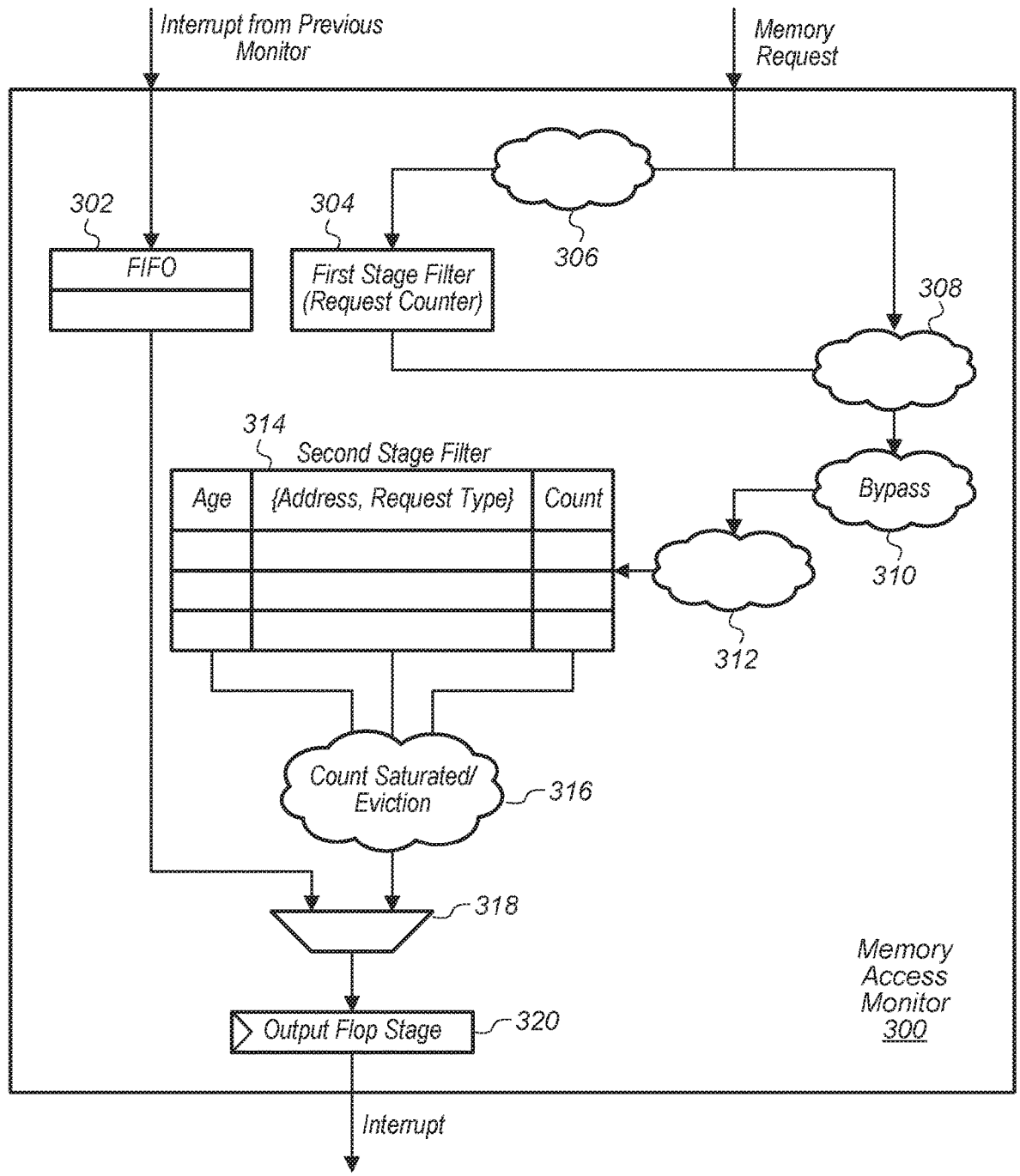
FIG. 3 is a block diagram of one embodiment of a memory access monitor.

Referring now to FIG. 3, one embodiment of a block diagram of a memory access monitor 300 is shown. In one embodiment, the logic of memory access monitor 300 is included in memory access monitors 210A-N (of FIG. 2) and memory access monitor 145 (of FIG. 1). In one embodiment, memory access monitor 300 is configured to receive interrupts from an adjacent memory access monitor (not shown) in a chain of memory access monitors (e.g., memory access monitors 210A-N). Memory access monitor 300 is also configured to monitor memory requests on a given memory channel of a computing system (e.g., system 100 of FIG. 1).

Interrupts received from other memory access monitors are stored in first-in, first-out (FIFO) buffer 302. FIFO buffer 302 is also coupled to multiplexer (or mux) 318, with the output of mux 318 coupled to output flop stage 320. The output of output flop stage 320 is coupled to an adjacent memory access monitor in the chain or to the interrupt handler (e.g., interrupt handler 220 of FIG. 2) if memory access monitor 300 is the last memory access monitor in the chain.

In one embodiment, first stage filter 304 is configured to count X valid requests traversing the memory channel, with X a positive integer, and with X being programmable. Logic 306 is configured to determine if a request is a valid request. In one embodiment, a valid request is a request which targets system memory. In another embodiment, a valid request is a request which targets a specific region of system memory. In other embodiments, other criteria for determining whether a request is a valid request can be utilized. After X valid requests have been counted, the next request over the memory channel is sent to second stage filter 314 via logic 308, 310, and 312. This next request resets the counter in first stage filter 304, with the counter starting to count again as new valid requests are detected on the memory channel. In one embodiment, second stage filter 314 maintains N lines of logs, with N a positive integer, and with the value of N varying from embodiment to embodiment. The N lines of logs can also be referred to N entries of a table.

When second stage filter 314 receives a request sent by first stage filter 304, if an entry for the request already exists (i.e., the address matches), then the counter for the existing entry is incremented. If there is no entry and an empty slot in second stage filter 314 is available, the entry will be allocated and information for the new request will be stored in the entry. If there is no empty slot, then the oldest entry in second stage filter 314 is evicted and the new request is installed in its place. When the counter for a particular entry is saturated (i.e., reaches a threshold), then an interrupt is generated by logic 316 and sent to the next memory access monitor in the chain. At the end of the chain of monitors, the interrupt will be sent to the interrupt handler.

Figure 4:
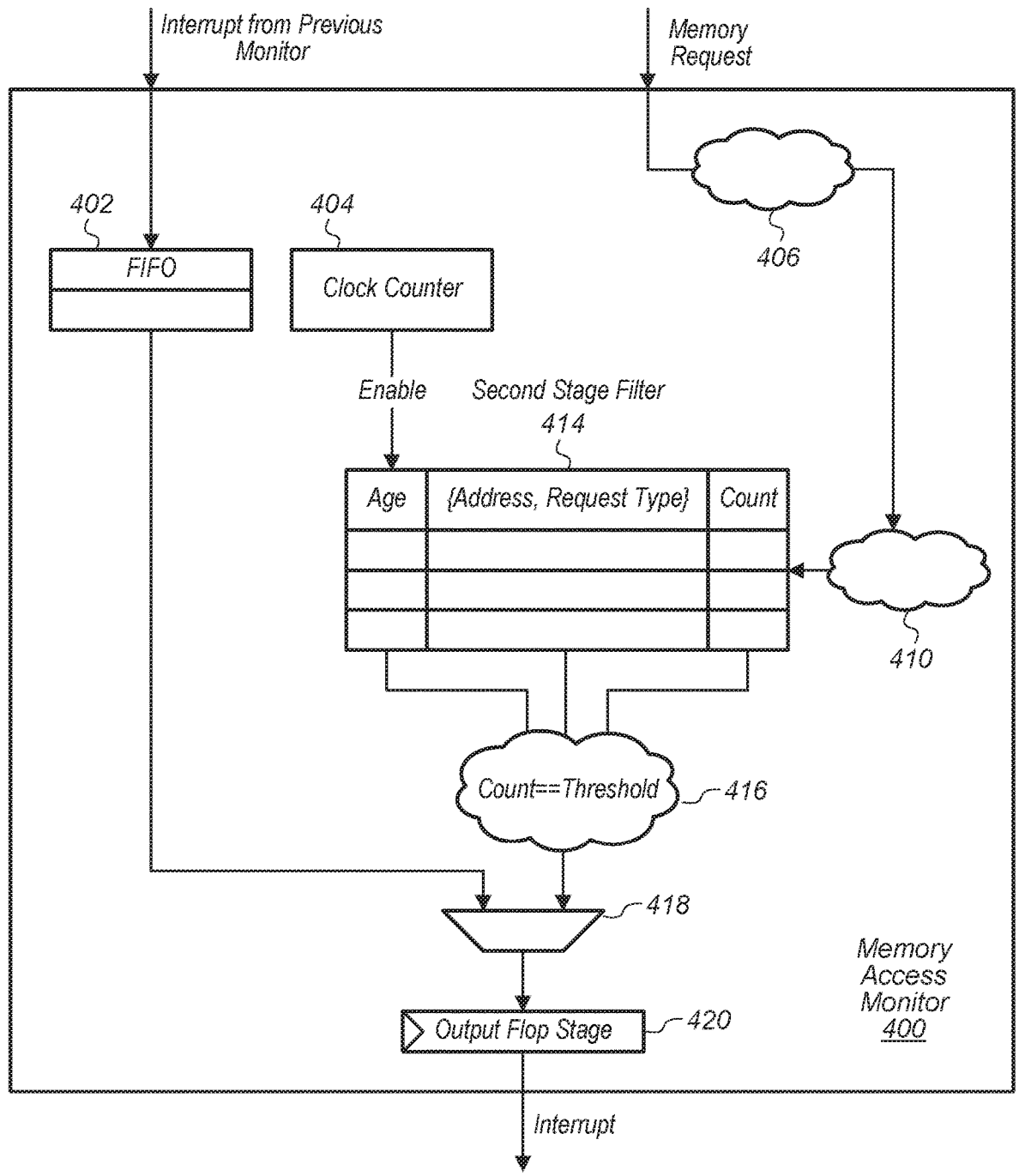
FIG. 4 is a block diagram of another embodiment of a memory access monitor.

Turning now to FIG. 4, another embodiment of a block diagram of a memory access monitor 400 is shown. In one embodiment, memory access monitor 400 is utilized in a second mode while memory access monitor 300 (of FIG. 3) is utilized in a first mode. In the second mode, memory access monitor 400 logs onto N addresses for a programmable interval and monitors for hits to these N addresses. If the hit counter saturates or if the programmable interval expires, the entry in second stage filter 414 is evicted. Requests take up lines in second stage filter 414 as the requests come into memory access monitor 400, as long as there are available entries in second stage filter 414.

An entry is allocated in second stage filter 414 by a received memory request via logic 406 and 410. When an entry is allocated in second stage filter 414 for a given page, the entry will stay in second stage filter 414 for a programmable interval while memory access monitor 400 tracks accesses to the given page. If the number of accesses to the given page hits a programmable threshold (indicating heavy usage) prior to the programmable interval expiring, then the entry for the given page is evicted from second stage filter 414 and an interrupt is generated with the information of the entry. In one embodiment, the information encoded into the interrupt includes the physical address of the request, the count (i.e., the number of times the address was accessed), the channel, and the request type. The request type includes whether the request was a read or a write and also indicates if the page was modified. In other embodiments, other information is encoded into the interrupt.

In one embodiment, the same hardware of memory access monitor 300 (of FIG. 3) is reused as memory access monitor 400 for the second mode. In the second mode, clock counter 404 generates pulses to send to second stage filter 414. In one embodiment, the age bits in the entries of second stage filter 414 are used as a coarse timer. When a pulse arrives at second stage filter 414 from clock counter 404, all valid entries in second stage filter 414 have their age incremented by one. If a valid entry's age has reached a maximum value (i.e., the age-counter has saturated), then on the next pulse from clock counter 404, the entry is evicted and if the count is less than the threshold, then no interrupt is generated. If the count is greater than the threshold, then an interrupt is generated by logic 416 and conveyed to the next memory access monitor via mux 418 and flop 420. Interrupts can also be received from the previous memory access monitor in the chain and stored in FIFO 402. These interrupts are then forwarded to the next memory access monitor in the chain via mux 418 and flop 420.

Figure 5:
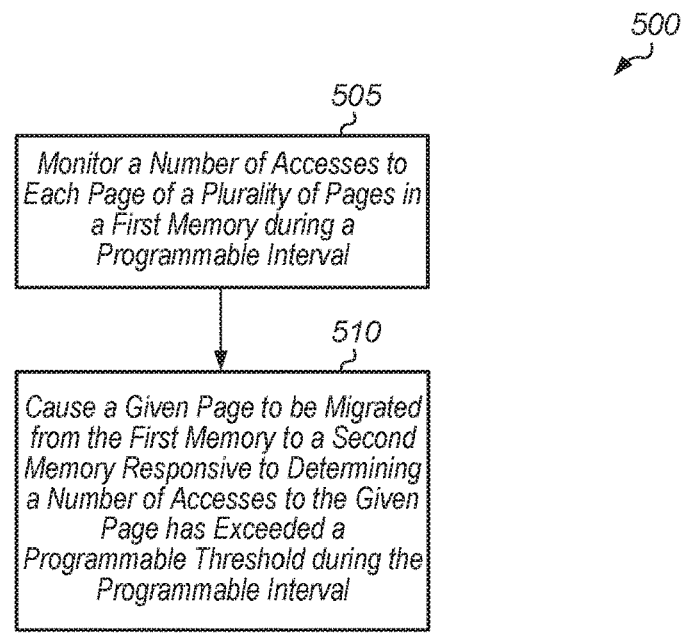
FIG. 5 is a generalized flow diagram illustrating one embodiment of a method for monitoring page reuse.
Figure 6:
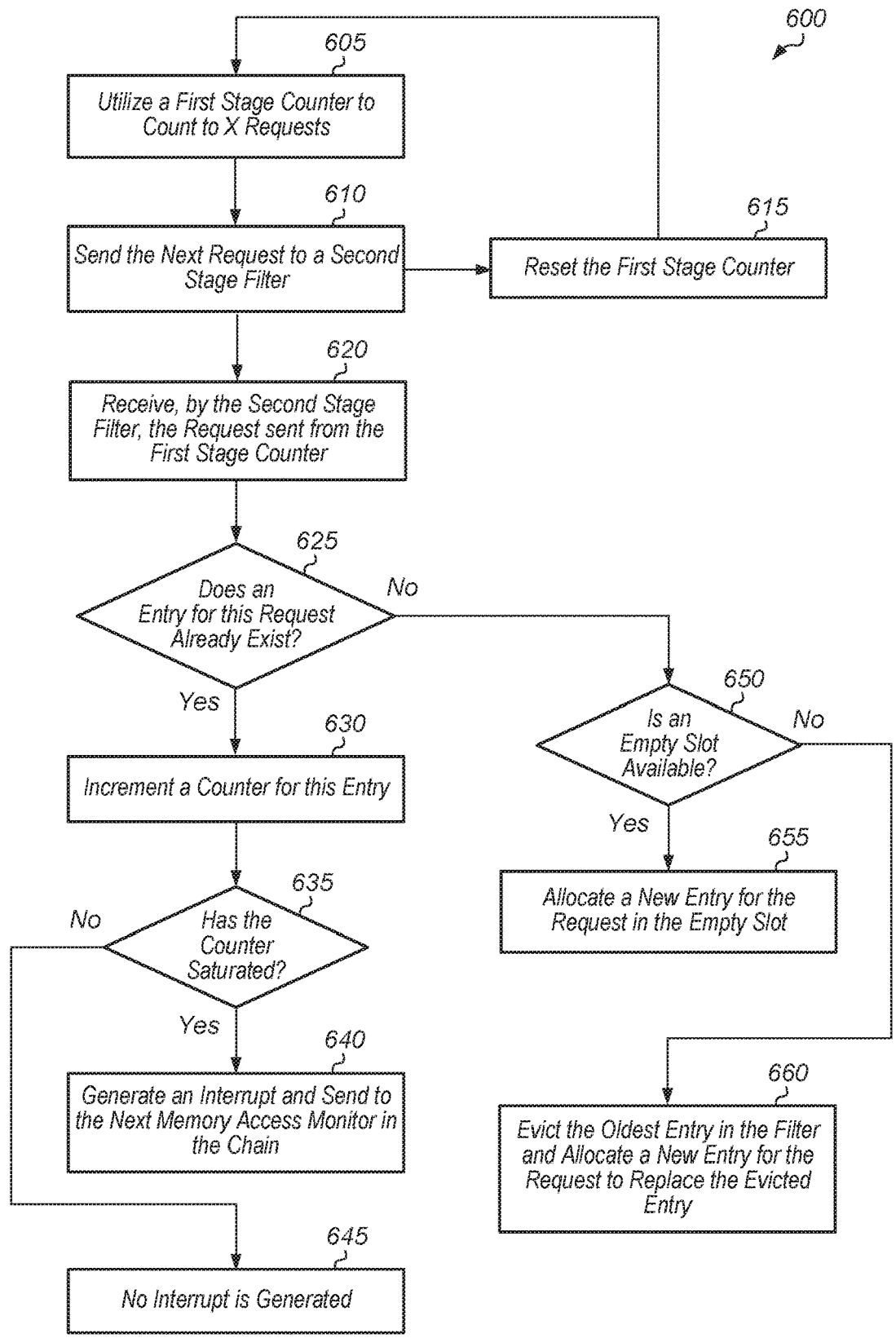
FIG. 6 is a generalized flow diagram illustrating one embodiment of a method for implementing a memory access monitor in a first mode.
Figure 7:
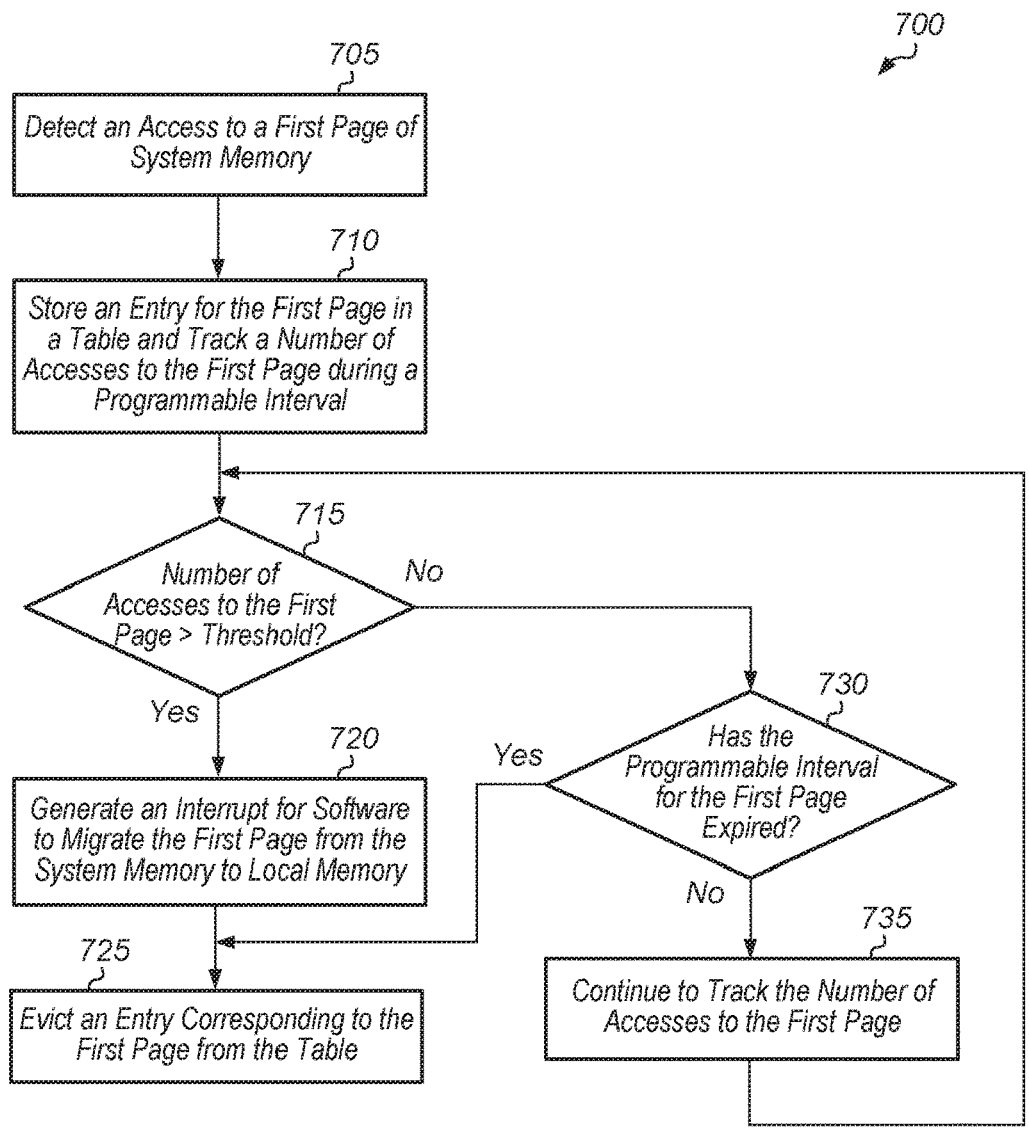
FIG. 7 is a generalized flow diagram illustrating one embodiment of a method for implementing a memory access monitor in a second mode.
Figure 8:
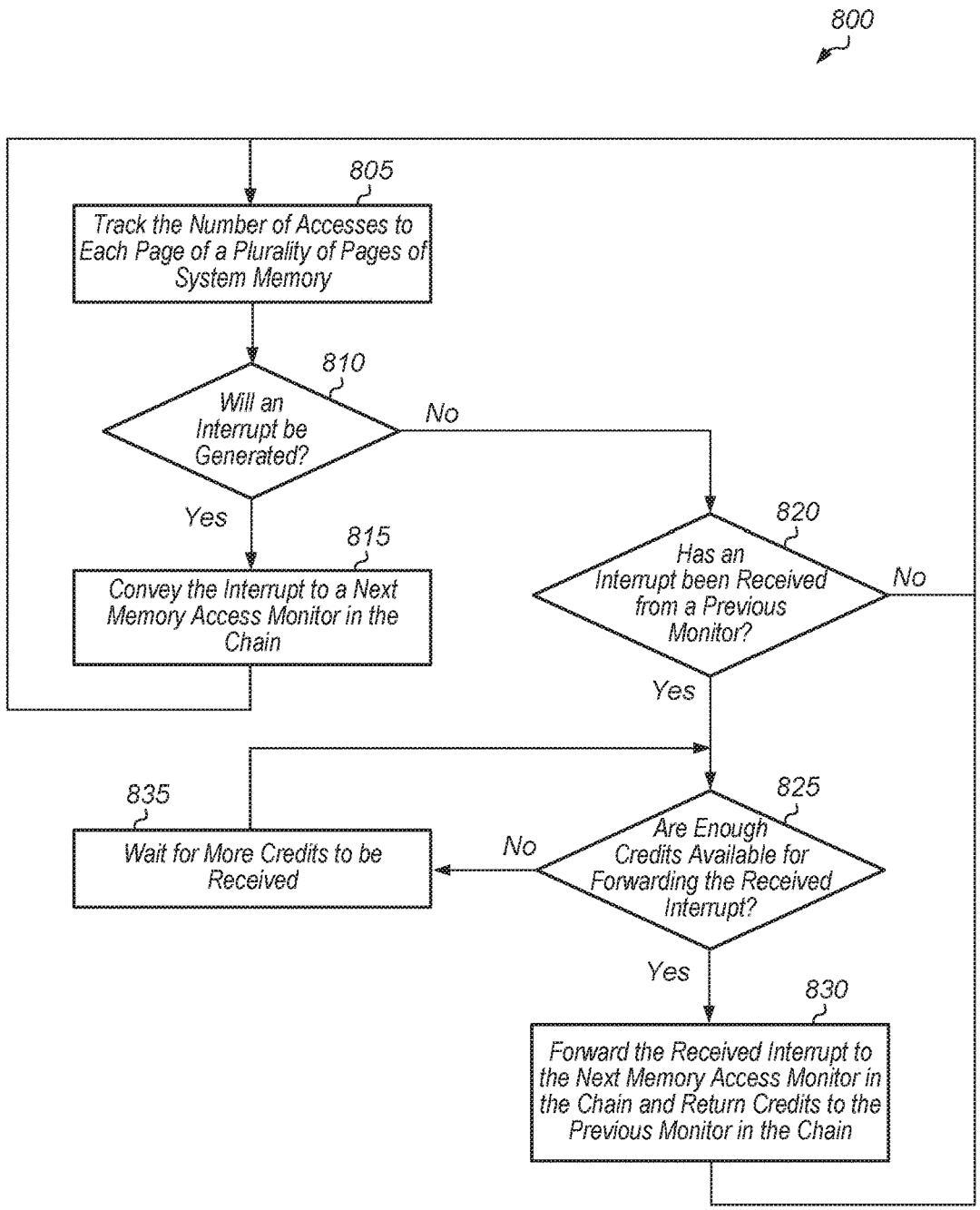
FIG. 8 is a generalized flow diagram illustrating one embodiment of a method for chaining interrupts together.

Referring now to FIG. 5, one embodiment of a method 500 for monitoring page reuse is shown. For purposes of discussion, the steps in this embodiment and those of FIGS. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A system monitors a number of accesses to each page of a plurality of pages in a first memory during a programmable interval (block 505). The system (e.g., system 100 of FIG. 1) includes at least one or more processors, a first memory, a second memory, and a control unit (e.g., memory access monitor 145 of FIG. 1). Next, the system causes a given page to be migrated from the first memory to a second memory responsive to determining a number of accesses to the given page has exceeded a programmable threshold during the programmable interval (block 510). In one embodiment, the control unit generates an interrupt for software to migrate the given page from the first memory to the second memory responsive to determining the number of accesses to the given page has exceeded the programmable threshold during the programmable interval. In one embodiment, the interrupt includes information specifying a number of accesses that were made to the given page during the programmable interval. After block 510, method 500 ends.

Turning now to FIG. 6, one embodiment of a method 600 for implementing a memory access monitor in a first mode is shown. A memory access monitor utilizes a first stage counter to count to X requests, wherein X is a positive integer, and wherein X varies from embodiment to embodiment (block 605). In one embodiment, the memory access monitor tracks requests on a first memory channel. In one embodiment, a computing system includes multiple memory channels, and a separate memory access monitor tracks requests on each of the separate memory channels. After the first stage counter counts up to X requests, the next request that comes in is sent to a second stage filter (block 610). Also, the first stage counter resets the counter (block 615), and then method 600 returns to block 605.

The second stage filter receives the request sent from the first stage counter (block 620). If an entry for this request already exists (conditional block 625, "yes" leg), then a counter for this entry is incremented (block 630). If the counter for this entry has saturated (conditional block 635, "yes" leg), then an interrupt is generated and sent to the next memory access monitor in the chain (block 640). If the memory access monitor is the last memory access monitor in the chain, then the interrupt is sent to an interrupt handler in block 640. If the counter for this entry has not saturated (conditional block 635, "no" leg), then no interrupt is generated (block 645).

If an entry for this request does not already exist (conditional block 625, "no" leg), then the second stage filter determines if there is an empty slot available (conditional block 650). If there is an empty slot available (conditional block 650, "yes" leg), then a new entry is allocated for the request in the empty slot (block 655). If there are no empty slots available (conditional block 650, "no" leg), then the oldest entry in the filter is evicted and a new entry is allocated for the request to replace the evicted entry (block 660).

Referring now to FIG. 7, one embodiment of a method 700 for implementing a memory access monitor in a second mode is shown. A memory access monitor detects an access to a first page of system memory (block 705). The size of the first page (e.g., 4 kilobytes) can vary from embodiment to embodiment. In response to detecting the access to the first page, the memory access monitor stores an entry for the first page in a table and tracks a number of accesses to the first page during a programmable interval (block 710). The duration of the programmable interval can vary from embodiment to embodiment. It is noted that the memory access monitor can track accesses to a plurality of pages simultaneously.

If the number of accesses to the first page has exceeded a programmable threshold prior to the programmable interval expiring (conditional block 715, "yes" leg), then the memory access monitor generates an interrupt for software to migrate the first page from the system memory to local memory (block 720). In one embodiment, the local memory is a high bandwidth memory (HBM). Also, the memory access monitor evicts an entry corresponding to the first page from the table (block 725). This entry is now available for monitoring a number of accesses to a different page of the system memory. After block 725, method 700 ends.

If the number of accesses to the first page has not exceeded the programmable threshold (conditional block 715, "no" leg), then the memory access monitor determines if the programmable interval for the first page has expired (conditional block 730). If the programmable interval for the first page has expired (conditional block 730, "yes" leg), then the memory access monitor evicts an entry corresponding to the first page from the table (block 725). If the programmable interval has not expired (conditional block 730, "no" leg), then the memory access monitor continues to track the number of accesses to the first page (block 735). After block 735, method 700 returns to conditional block 715. It is noted that method 700 can be implemented simultaneously for multiple different pages. Accordingly, the memory access monitor is configured to monitor multiple different pages at the same time to determine if the number of accesses to any of these pages exceeds a threshold in a given interval.

Turning now to FIG. 8, one embodiment of a method 800 for chaining interrupts together is shown. A memory access monitor tracks the number of accesses to each page of a plurality of pages of system memory (block 805). Based on this tracking, the memory access monitor determines whether to generate an interrupt (conditional block 810). If the memory access monitor determines that an interrupt should be generated (conditional block 810, "yes" leg), then the memory access monitor generates an interrupt and conveys the interrupt to a next memory access monitor in the chain of memory access monitors (block 815). If the memory access monitor is the last memory access monitor in the chain, then the memory access monitor conveys the interrupt to an interrupt handler in block 815. After block 815, method 800 returns to block 805.

If the memory access monitor determines that an interrupt should not be generated (conditional block 810, "no" leg), then the memory access monitor checks whether an interrupt has been received from a previous memory access monitor in the chain (conditional block 820). If the memory access monitor is the first memory access monitor in the chain, then conditional block 820 can be omitted and method 800 can return to block 805. If an interrupt has been received from the previous memory access monitor in the chain (conditional block 820, "yes" leg), then the memory access monitor determines if enough credits are available for forwarding the received interrupt to the next memory access monitor in the chain (conditional block 825). If an interrupt has not been received from the previous memory access monitor in the chain (conditional block 820, "no" leg), then method 800 returns to block 805 with the memory access monitor continuing to tracks the number of accesses made to a plurality of pages of system memory.

If enough credits are available for forwarding the received interrupt to the next memory access monitor in the chain (conditional block 825, "yes" leg), then the memory access monitor forwards the received interrupt to the next memory access monitor in the chain and return credits to the previous monitor in the chain (block 830). If the memory access monitor is the last monitor in the chain, then the memory access monitor forwards the received interrupt to the interrupt handler in block 830. After block 830, method 800 returns to block 805. If there are not enough available credits for forwarding the received interrupt to the next memory access monitor in the chain (conditional block 825, "no" leg), then the memory access monitor waits for more credits to be received (block 835). Then, after block 835, method 800 returns to conditional block 825.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a first memory;
a second memory; and
a plurality of control units;
wherein a first control unit is configured to:
  count, in a first stage filter, X valid requests traversing a first memory channel, wherein X is a positive integer;
  send a subsequent request to a second stage filter after counting X valid requests, wherein the second stage filter is configured to store a plurality of entries with each identifying a request and its corresponding age;
  increment a counter if a first entry already exists in the second stage filter that corresponds to a first page targeted by the subsequent request;
  responsive to detecting that the counter has reached a threshold:
    generate a first interrupt that includes an identifier of the first memory channel via which the first page was accessed; and
    cause the first page to be migrated from the first memory to the second memory.

2. The system as recited in claim 1, wherein the first control unit is further configured to:
generate a first interrupt responsive to detecting that the counter in the first entry has exceeded the threshold; and
convey the first interrupt to a second control unit;
wherein the second control unit is configured to convey the first interrupt to an interrupt handler.

3. The system as recited in claim 2, wherein the system comprises one or more processors, wherein program instructions executed by the one or more processors are configured to migrate the given page from the first memory to the second memory responsive to the interrupt handler receiving the first interrupt.

4. The system as recited in claim 1, wherein the first control unit is configured to monitor accesses to a plurality of pages during a programmable interval.

5. The system as recited in claim 4, wherein responsive to determining a given programmable interval for a given page has expired, the first control unit is configured to evict an entry for the given page from the table.

6. The system as recited in claim 1, wherein in response to receiving the subsequent request, the second stage filter is configured to:
update a counter of a first entry of the plurality of entries, if the first entry includes data that matches the subsequent request;
evict an existing entry of the plurality of entries, if the subsequent request does not match any of the plurality of entries and all of the plurality of entries are currently occupied.

7. A method comprising:
counting, in a first stage filter of a first control unit, X valid requests traversing a first memory channel, wherein X is a positive integer;
sending a subsequent request to a second stage filter after counting X valid requests, wherein the second stage filter is configured to store a plurality of entries with each identifying a request and its corresponding age;
incrementing a counter if a first entry already exists in the second stage filter that corresponds to a first page targeted by the subsequent request;
responsive to detecting that the counter has reached a threshold:
  generating a first interrupt that includes an identifier of the first memory channel via which the first page was accessed; and
  causing the first page to be migrated from the first memory to the second memory.

8. The method as recited in claim 7, further comprising:
generating a first interrupt responsive to detecting that the counter in the first entry has exceeded the threshold;
conveying the first interrupt to a second control unit; and
conveying the first interrupt from the second control unit to an interrupt handler.

9. The method as recited in claim 8, further comprising migrating the given page from the first memory to the second memory responsive to the interrupt handler receiving the first interrupt.

10. The method as recited in claim 7, further comprising monitoring accesses to a plurality of pages during a programmable interval.

11. The method as recited in claim 7, wherein in response to receiving the subsequent request, the method comprising second stage filter:
updating a counter of a first entry of the plurality of entries, if the first entry includes data that matches the subsequent request;
evicting an existing entry of the plurality of entries, if the subsequent request does not match any of the plurality of entries and all of the plurality of entries are currently occupied.

12. The method as recited in claim 11, wherein each page of the plurality of pages has a separate programmable interval.

13. An apparatus comprising:
a first memory;
a second memory;
one or more processors; and
a plurality of control units;
wherein a first control unit is configured to;
  count, in a first stage filter, X valid requests traversing a first memory channel, wherein X is a positive integer;
  send a subsequent request to a second stage filter after counting X valid requests, wherein the second stage filter is configured to store a plurality of entries with each identifying a request and its corresponding age;
  increment a counter if a first entry already exists in the second stage filter that corresponds to a first page targeted by the subsequent request;
  responsive to detecting that the counter has reached a threshold:

generate a first interrupt that includes an identifier of the first memory channel via which the first page was accessed; and cause the first page to be migrated from the first memory to the second memory.

14. The apparatus as recited in claim 13, wherein the first control unit is further configured to:

generate a first interrupt responsive to detecting that the counter in the first entry has exceeded the threshold; and convey the first interrupt to a second control unit;

wherein the second control unit is configured to convey the first interrupt to an interrupt handler.

15. The apparatus as recited in claim 14, wherein program instructions executed by the one or more processors are configured to migrate the given page from the first memory to the second memory responsive to the interrupt handler receiving the first interrupt.

16. The apparatus as recited in claim 13, wherein the first control unit is configured to monitor accesses to a plurality of pages during a programmable interval.

17. The apparatus as recited in claim 13, wherein in response to receiving the subsequent request, the second stage filter is configured to:

update a counter of a first entry of the plurality of entries, if the first entry includes data that matches the subsequent request;

evict an existing entry of the plurality of entries, if the subsequent request does not match any of the plurality of entries and all of the plurality of entries are currently occupied.

\* \* \* \* \*